United States Patent [19]

Newell

[11] Patent Number: 5,651,064
[45] Date of Patent: Jul. 22, 1997

[54] SYSTEM FOR PREVENTING PIRACY OF RECORDED MEDIA

[75] Inventor: Chester W. Newell, Alberta, Canada

[73] Assignee: 544483 Alberta Ltd., Edmonton, Canada

[21] Appl. No.: 401,025

[22] Filed: Mar. 8, 1995

[51] Int. Cl.$^6$ ...................................................... H04L 9/00
[52] U.S. Cl. ............................ 380/4; 380/21; 380/49; 380/3
[58] Field of Search ............................ 380/4, 21, 49, 380/3, 50

[56] References Cited

U.S. PATENT DOCUMENTS

| | | | |
|---|---|---|---|
| 4,588,991 | 5/1986 | Atalla | 380/4 |
| 4,685,055 | 8/1987 | Thomas | 380/4 |
| 4,780,905 | 10/1988 | Cruts et al. | 380/44 |
| 4,796,220 | 1/1989 | Wolfe | 380/4 |
| 4,827,508 | 5/1989 | Shear | 380/4 |
| 5,047,928 | 9/1991 | Wiedemer | 364/406 |
| 5,138,712 | 8/1992 | Corbin | 395/700 |
| 5,146,497 | 9/1992 | Bright | 380/21 |
| 5,150,408 | 9/1992 | Bright | 380/21 |
| 5,173,938 | 12/1992 | Steinbrenner et al. | 380/21 |
| 5,182,770 | 1/1993 | Medveczky et al. | 380/4 |
| 5,272,752 | 12/1993 | Myers et al. | 380/23 |
| 5,291,554 | 3/1994 | Morales | 380/5 |
| 5,301,232 | 4/1994 | Mulford | 380/21 |
| 5,337,357 | 8/1994 | Chou et al. | 380/4 |
| 5,343,525 | 8/1994 | Hung et al. | 380/4 |
| 5,394,469 | 2/1995 | Nagel et al. | 380/4 |
| 5,483,658 | 1/1996 | Grube et al. | 380/4 X |
| 5,513,262 | 4/1996 | Van Rumpt et al. | 380/29 |

*Primary Examiner*—Thomas H. Tarcza
*Assistant Examiner*—Pinchus M. Laufer
*Attorney, Agent, or Firm*—Thomas Schneck

[57] ABSTRACT

A system for preventing unauthorized copying of recorded information has a number of independently identifiable storage media holding the information in encrypted form and a number of drives for the storage media, the drives each having a key which decrypts the information on at least one of the storage media. The drives are in communication with a host computer which compares the identities of the storage media with each other and with an authorized list of identities. Should an identity be unauthorized or duplicated, indicating unauthorized copying, the host computer can send a message to the corresponding drive that disables either that drive or the storage medium having that identity. The host computer periodically revises the encryption codes of the control and storage media that are authorized and not duplicated.

21 Claims, 2 Drawing Sheets

SYSTEM FOR PREVENTING PIRACY OF RECORDED MEDIA

TECHNICAL FIELD

The present invention relates to systems for preventing unauthorized copying of distributed information modules such as audio, video or software disks or tapes.

BACKGROUND ART

Unauthorized copying of recorded works has been a problem to the rightful owners of those works for centuries, providing a reason for the promulgation of copyright laws. With advances in technology, however, the ability to copy has become increasingly feasible and affordable. In particular, modern storage of information is often digital in nature, which allows repeated copying without incremental deterioration each time a copy is made. In addition, prerecorded audio, video or software programs often sell millions of legitimate copies, providing an incentive to those who may be tempted to risk running afoul of copyright laws to produce and sell pirated copies.

Several systems have been developed to thwart unauthorized copying. In U.S. Pat. No. 5,182,770, Medveczky et al. teach an integrated software piracy prevention system incorporating identification codes for installation and software components. The licensed software has an embedded program identification code, and an attached hardware device also has an embedded code, the hardware code and software code used to encrypt and decrypt the program and combining to provide an identification signature corresponding to a specific password. However, provision is not made for the situation in which the encryption code is broken and a number of copies of the software including the code are produced. U.S. Pat. No. 5,138,712 to Corbin provides a different approach to licensing software, in which a license server acts as an intermediary between an application program and a licensing library. This approach works best for computer networks allowing a restricted number of users to access the software at any given time.

In U.S. Pat. No. 5,291,554, Morales describes a pay per view television system that includes cryptographic keys for restricting access to movies and other video programs broadcast from a satellite to individual subscribers. Copying is possible once the programs have been decrypted by a subscriber. For communication systems such as radios and cellular telephones which are frequently operated, rekeying encryption codes of individual units such as telephones is employed to prevent unauthorized use of the communication system, as described in U.S. Pat. No. 5,173,938 to Steinbrenner et al. Further, U.S. Pat. Nos. 5,146,497 and 5,150,408 to Bright teach methods for providing such rekeying which corrects for delays in rekeying caused by communication, including resending rekeying messages when acknowledgement of the rekeying is not received from all of the communication units. U.S. Pat. No. 5,301,232 to Mulford teaches a key management system that determines whether individual communication units are using an old encryption scheme.

Despite these improvements, a need still exists to provide a better method for preventing unauthorized copying and distribution of prerecorded material such as audio, video and software programs. A particular object of the present invention is to provide protection against unauthorized copying and distribution, even in the event an encryption code designed to protect against such copying is broken.

SUMMARY OF THE INVENTION

The above object has been met with a system that allows for distribution of valuable recorded information such as audio, video or software programs on storage media such as optical or magnetic disks or tapes while protecting that information against unauthorized copying by making such copying difficult and uneconomical.

A number of information storage media each having a large data storage capacity for information that can be written, read and rewritten many times is provided, along with drives that can read and write data on the storage media. Information such as a prerecorded program is stored on the storage media in an encrypted form which can be decrypted by the associated drives. Each of the storage media may employ a different encryption code, limiting decryption of the stored information to a particular, mated drive. Among the encrypted information found in each storage medium is an individual identity code of that storage medium, which when inserted into a drive can provide an identity of a mated drive.

The drives are each equipped with a means for communicating with a host computer. Preferably such communication means include a satellite that transmits signals between the host computer and universal asynchronous receive and transmit (UART) chips connected to the drives. Alternatively, the communication between the host computer and the drives may be by means of a network of wires or telephone lines or a computer network, such as the Internet. The encrypted information on the storage medium and the encryption key of the drive allow limited reading of the encrypted information by the drive before the drive must be contacted by the host computer, ensuring that the drives remain in communication with the host computer.

The host computer periodically interrogates the drives regarding their identity or the identity of their associated storage media. The host computer also periodically revises the encryption codes of the drives or associated storage media, in order to make decoding the encryption codes more difficult. Upon receiving identities from the various drives the host computer checks for a duplicated identity of any of the drives or storage media. Since a duplicated identity indicates that a particular program has been copied without authorization, the host computer transmits signals to the drives which disable all of the drives or storage media having that duplicated identity. The host computer may also check the identities it has received against a list of authorized identities, and thereupon may disable any control or storage media having unauthorized identities.

In order to compensate any authorized owners having drives or storage media that were mistakenly disabled, the units are sold with a guarantee of replacement of several units or several times the purchase price if the units fail. However, since authorized units that have been disabled due to duplicate identities may be linked to unauthorized copying, this replacement offer may actually provide clues as to a source of illegal copying.

BEST MODE FOR CARRYING OUT THE INVENTION

Figure 1:
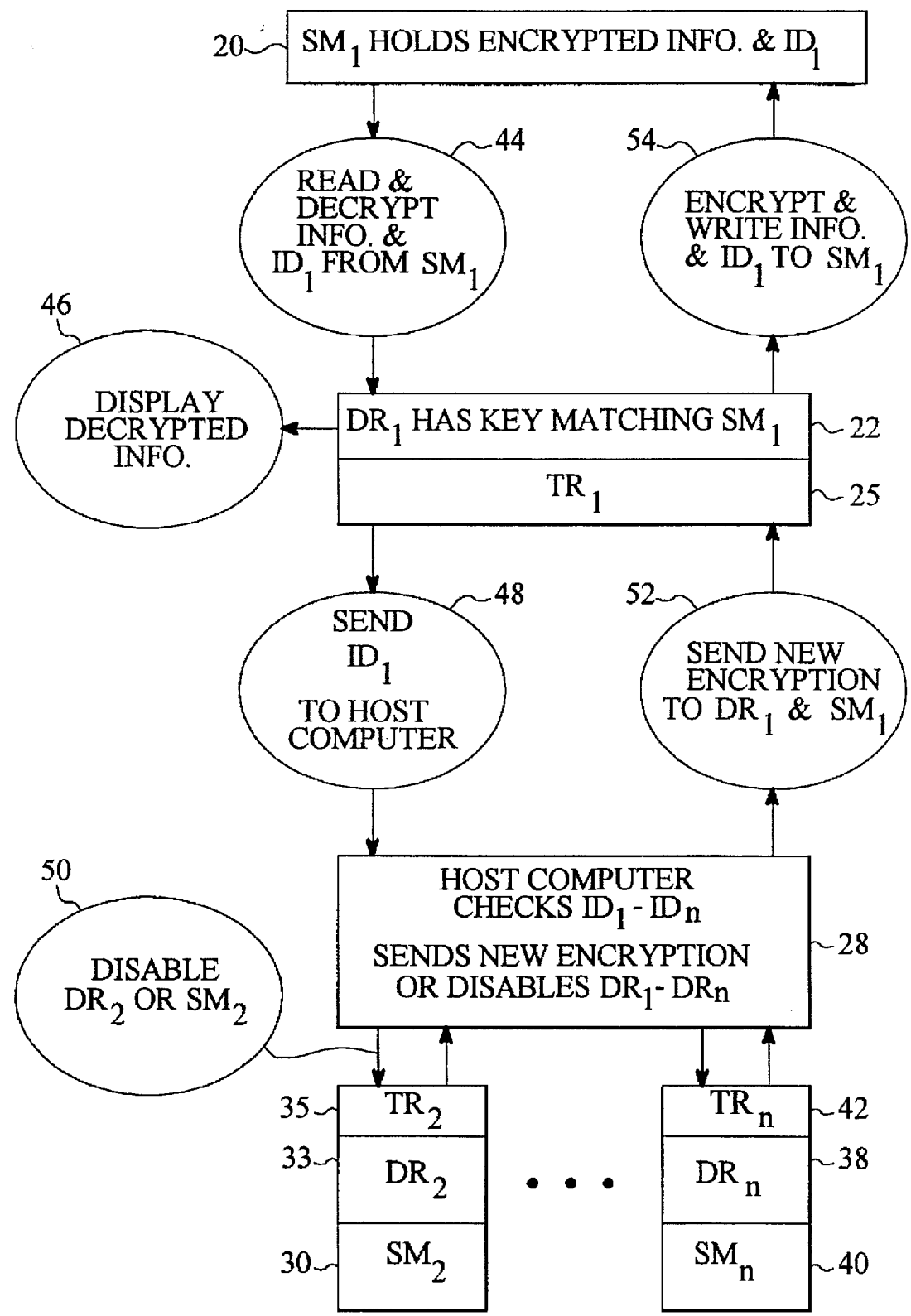
FIG. 1 is a block diagram of the system of the present invention.

Referring now to FIG. 1, a system of the present invention has a first storage medium $SM_1$ 20 which stores encrypted information including an identification $ID_1$ of $SM_1$. $SM_1$ may be an optical data recording disk or tape, a magnetic disk or tape, or a non-volatile semiconductor based memory such as flash memory card. The encrypted information may contain, for example, a movie or video game, an audio recording or a computer program.

In order to read the information which is stored on $SM_1$ 20, a drive $DR_1$ 22 is connected with $SM_1$. $DR_1$ 22 also has a means for decrypting the encrypted information that is stored on SM1 20, so that the information can be displayed in a form suitable for human perception, typically involving sight and/or hearing, or use by another device such as a computer. In other words, $DR_1$ 22 is able to read and decrypt $SM_1$ 20, like a conventional tape player can play a prerecorded tape, so that the encrypted information stored on $SM_1$ is accessible by a person or machine operating $DR_1$. In order to decrypt the encrypted information stored on $SM_1$ 20, $DR_1$ 22 has electronic circuitry preferably combined with a non-volatile memory on a semiconductor chip, which is programmed with a key that unlocks the encryption with which the information on $DR_1$ is stored.

A variety of encryption techniques may be employed for encrypting and decrypting the information on $SM_1$, such as the well known RSA system described in U.S. Pat. No. 4,405,829. Due to other checks that are provided in the present invention, as described below, less sophisticated and more economical encryption techniques may be alternatively employed.

$DR_1$ 22 also has an attached transceiver $TR_1$ 25 which is able to send and receive messages from a host computer 28. The host computer is preferably in communication via a satellite, not shown, which provides wireless relay of signals between the host computer 28 and $TR_1$ 25. $TR_1$ in this case is a universal asynchronous receive and transmit (UART) device that communicates packets of data between the drive $DR_1$ 22 and the host computer 28 via electromagnetic waves. In another embodiment, information is sent between $DR_1$ 22 and host computer 28 by means of electrically conductive or fiber optic wires, not shown, such as is available with telephone or computer networks, in which case $TR_1$ is typically a modem or network connector, and signals to and from the host 28 are sent via a router.

Another information storage medium $SM_2$ 30, and its mated drive $DR_2$ 33 are also in communication with host computer 28 via a transceiver $TR_2$ 35. The information stored on $SM_2$ may be very similar to that stored on $SM_1$, except that $SM_2$ has a different identity than $SM_1$, and the information stored on $SM_2$ is encrypted with a different code than that stored on $SM_1$. $D_2$ is programmed with a key which unlocks the encryption code of $SM_2$. In practice, a great number (n) of mated pairs of storage media and drives, represented in FIG. 1 as $DR_n$ 38 and $SM_n$ 40, may exist in communication with host computer 28 via transceivers $TR_n$ 42, and the location of various mated pairs $SM_n$ and $DR_n$ and attached transceivers $TR_n$ may be geographically diverse. It is also possible that for each drive $DR_z$ a variable number of storage media $SM_a$–$SM_e$ exist, provided that the drive $D_Z$ can decrypt information on each of the storage media $SM_a$–$SM_e$.

In operation, beginning somewhat arbitrarily with encrypted information stored on $SM_1$, $DR_1$ reads and decrypts information from $SM_1$, including reading the identity $ID_1$ of $SM_1$, as shown in step 44. This step 44 could have been prompted by either an operator using $DR_1$ to decrypt the information in $SM_1$ or by polling from the host computer 28 to verify the authenticity of the storage media $SM_n$. If the step 44 was operator requested, $DR_1$ then provides the decrypted information to a connected device such as a television or personal computer for display or use by the operator, as shown in step 46. If the step 44 was requested by the host computer 28, $DR_1$ 22 then sends $ID_1$ to the host 28 without displaying decrypted information, as shown in step 48. Since a request for identification is sent from the host computer 28 to all pairs of storage and drives $DR_1$–$DR_N$ and $SM_1$, other drives $DR_1$–$DR_N$ also send their identification $ID_1$–$ID_N$ to the host 28, via transmitters $TR_1$–$TR_N$.

The host computer 28 performs several operations upon receipt of the identifications $ID_1$–$ID_N$. First, the host 28 checks the identifications $ID_1$–$ID_N$ against a list of authorized identifications, the list of authorized identifications corresponding to those storage media which were sold or licensed. Any identification $ID_x$ which is received by the host 28 that does not match with an identification on the authorized list is stored by the host 28. Second, the host 28 checks the identifications $ID_1$–$ID_N$ that it has received from transmitters $TR_1$–$TR_N$ for duplicate identifications. Note that this operation of checking for duplicate identifications can be performed previous to or concurrently with the operation of checking for unauthorized identifications. Note also that the identifications $ID_1$–$ID_N$ may actually be the encryption codes or keys with which the information is encrypted and decrypted. Any identification $ID_y$ which is received by the host 28 that matches with another identification $ID_y$ received by the host 28 is stored.

Upon storing any identifications $ID_x$ or $ID_y$ that indicate either the use of an unauthorized copy of the information or the unauthorized copying of that information, the host computer 28 has a number of options. The host 28 can send disabling signals to the transmitters $TR_x$ and $TR_y$ that are associated, respectively, with the unauthorized identification $ID_x$ and the copied identification $ID_y$, and that disable either the respective storage media $SM_x$ and $SM_y$ or drives $DR_x$ and $DR_y$, as shown in step 50, in which $DR_2$ or $SM_2$ is disabled. Such disabling signals can, for example, involve changing an encryption code of either a drive or a mated storage medium, but not both, so that the drive cannot decrypt information from the storage medium. Alternatively, the host computer 28 may be programmed, for instance, to allow for a single duplicate identity $ID_y$ without disabling corresponding storage media $SM_y$ or drives $DR_y$, so that archival copying or home copying is not prevented, but to disable $DR_y$ or $SM_y$ if multiple duplicates of $ID_y$ are discovered by the host computer 28, thereby rendering unauthorized copying worthless. Another option that may be employed by the host 28 is to find the location of the $TR_x$ or $TR_y$ associated with unauthorized or duplicated programs, for enforcement of copyright laws.

The host computer 28 also periodically or in response to each identification check sends out revised encryption codes to transmitters such as $TR_1$ which have an identification $ID_1$ which is neither unauthorized nor duplicated, as shown in step 52. For the case in which the encryption codes or keys correspond with the identifications, revising the encryption codes also results in revising the identifications $ID_1$–$ID_N$ of each of the mated pairs $DR_1$–$DR_N$ and $SM_1$–$SM_N$. For example, the transceiver $TR_1$ transmits the revised encryption to the connected controller $DR_1$, which then rewrites the information stored on storage medium $SM_1$ in encrypted form with the new encryption key, as shown in step 54.

To ensure the maintenance of communication between the drives $DR_1$–$DR_N$ and the host computer 28, the storage media $SM_1$–$SM_N$ are restricted in the number of times they can be read before contact is made with the host 28. This restriction may be enforced, for example, by rewriting a small part of the encrypted information with each reading of storage media $SM_1-SM_N$. After a set number of readings, decryption of the information would be disallowed, and a message displayed to the operator that contact with the host 28 is necessary. Alternatively, communication with the host 28 may be required after each reading of information by one of the drives $DR_1-DR_N$. As another example, the drives $DR_1-DR_N$ may have timers which require a periodic contact with the host 28 on a daily, weekly or monthly basis. In this case an update may occur overnight or with the first time during a day that a computer, television or other device connected to the drive is turned on.

Figure 2:
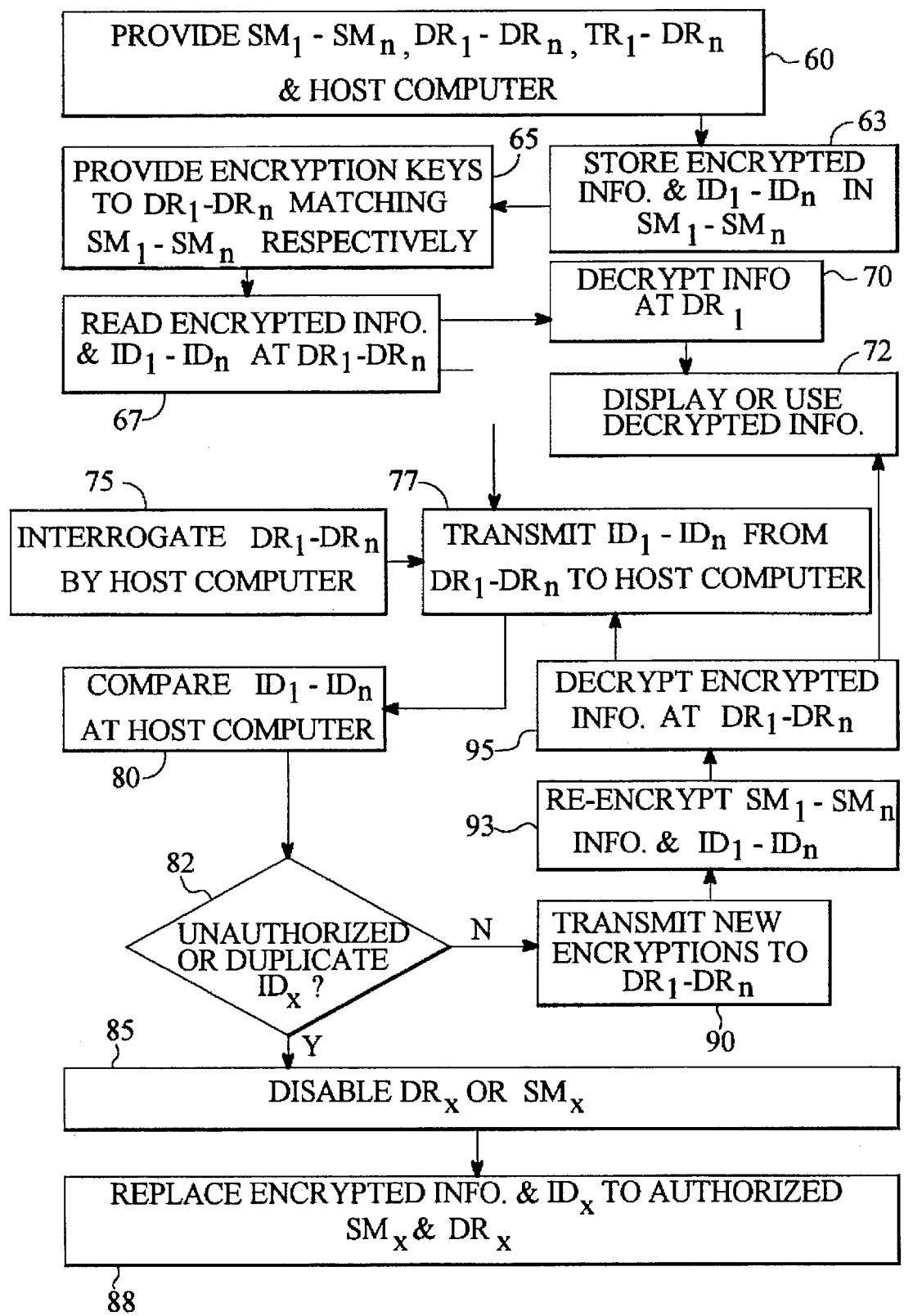
FIG. 2 is a block diagram of a method of employing the system of FIG. 1.

Referring now to FIG. 2, a method of the present invention is illustrated, beginning at step 60 with providing storage media $SM_1-SM_N$, driver $DR_1-DR_N$, transceivers $TR_1-TR_N$ and a host computer. Since this system utilizes mated drives $DR_1-DR_N$ and storage media $SM_1-SM_N$, it is preferably implemented with a new portable storage technology that does not have an installed base of drive units. Such storage technologies may include, for instance, optical tapes or disks and their associated drive mechanisms, flash memory card systems or ferroelectric memory systems. Alternatively, add on hardware or software keys, and transceivers if needed, could be provided along with prerecorded software for existing computer drives. Due to the large amounts of money estimated to be lost by producers of valuable information such as computer software to unauthorized copying, the cost of adding encryption keys to the software may well prove to be economical.

The encrypted information and identifications $ID_1-ID_N$ are then stored 63 in storage media $SM_1-SM_N$. Encryption keys are provided 65 to the drives $DR_{1-n}$ that mate with the storage media $SM_1-SM_N$. Note that the encryption keys may be preprogrammed in $DR_1-DR_N$ or may be provided by the host computer upon communication of $DR_1-DR_N$ with that host computer. The encrypted information and identifications $ID_1-ID_N$ are then read 67 by one or more of the drives $DR_1-DR_n$. With the drives $DR_1-Dr_n$ having keys matching their respective storage media $SM_1-SM_N$, the encrypted information can then be decrypted 70 by the one or more of drives $DR_1-DR_N$. The decrypted information can then be displayed or otherwise used 72 by a person or machine operator.

Either in response to an interrogation 75 of $DR_1-DR_N$ by the host computer, or a periodic or use based identification requirement as described above, the identifications $ID_1-ID_N$ are transmitted 77 from drives $DR_1-DR_N$ to the host computer. The host computer then compares 80 identifications $ID_1-ID_N$ with each other and with a list of authorized identifications. If one of those identifications $ID_x$ is unauthorized or duplicated, as shown in decision block 82, either $DR_x$ or $SM_x$ may be disabled 85 by the host computer. Upon discovering that their units $DR_x$ or $SM_x$ are no longer operable, authorized owners of the units are encouraged to return their units for replacement 88 by an offer, communicated to the owners at the time of purchase, of receiving replacement money or programs worth several times the purchase price. Such disablement also helps to track unauthorized copying, as holders of unauthorized copies of information may be tempted to bring their storage media $SM_x$ for repair or replacement. Also, for the situation in which an authorized storage medium $SM_x$ is returned that is recognized by the host computer upon the return as being a storage medium for which a number of duplicate identifications $ID_x$ are stored, an indication of a source of illegal copying may have been discovered.

Returning now to decision block 82, for identifications $ID_1-ID_N$ which are authorized and not duplicated, new encryption codes may be transmitted 90 from the host computer to $DR_1-DR_N$ via $TR_1-TR_N$. These new codes are used to re-encrypt 93 the information and identifications $ID_1-ID_N$ on $SM_1-SM_n$. The drives $DR_1-DR_n$ are then able to be used again to decrypt the encrypted information held in storage media $SM_1-SM_N$, as shown in step 95, after which the information can be displayed or used 72. The identifications $ID_1-ID_N$ may also be transmitted 77 to the host computer at this time, periodically or in response to an inquiry from the host computer.

I claim:

1. A system for storing and retrieving information comprising:

a plurality of information storage media being both readable and writable, each of said storage media storing encrypted information, said encrypted information including an identity of said storage medium, a drive associated in a read/write relationship with each of said storage media, said drive having means for storing a cryptographic key in said drive, said drive further having means for reading said encrypted information from an associated storage medium and means for decrypting said encrypted information based on said cryptographic key as said encrypted information is read by said means for reading, said drive also having means for encrypting information based on said cryptographic key and for writing encrypted information on said storage medium, and a host computer having means for communicating with each said drive including means for receiving from said drive said identity of said storage medium and means for transmitting to said drive a revised cryptographic key for encrypted writing on said associated storage medium, said host computer also having means for checking for a duplicated identity of said storage medium and means fur disabling all storage media having said duplicated identity.

2. The system of claim 1 wherein said identity is an encryption key.

3. The system of claim 1 wherein said host computer further includes means for checking for an unauthorized identity of said storage medium and means for disabling said storage medium having said unauthorized identity.

4. The system of claim 1 wherein said host computer further includes means for disabling all of said storage media in response to receiving from said drive at least one of said duplicated identity and an unauthorized identity.

5. The system of claim 1 wherein said means for communication of said host computer and said drive includes a satellite.

6. The system of claim 1 wherein each said storage medium has an independent encryption key and each said associated drive has a key fitting said encryption key.

7. The system of claim 1 wherein said information storage media include an optical storage medium.

8. The system of claim 1 wherein said information storage media include a magnetic storage medium.

9. The system of claim 1 wherein said information storage media include non-volatile semiconductor memories.

10. The system of claim 1 further comprising means, connected with said drive, for providing said decrypted information to a remote system.

11. A method for preventing piracy of recorded information comprising:

providing a plurality of information storage media and a plurality of drives associated with said storage media, a host computer and a means for communication between said drives and said host computer, said storage media being both readable and writable, said storage media including optical disks and magnetic disks, said drives encrypting and storing information including a different identity in each of said storage media, said drives reading encrypted information stored on said storage media including decrypting on-the-fly said encrypted information, the encryption and decryption performed using a cryptographic key stored within said associated drive transmitting said identities of said storage media to said host computer from said drives, comparing said identities by said host computer, and if an identity of a storage medium is duplicated, disabling all storage media having said duplicated identity by said host computer.

12. The method of claim 11 wherein said comparing said identities by said host computer includes matching said identities with a list of authorized identities, and if a storage medium has an identity different from said authorized identities, disabling said storage medium having said different identity.

13. The method of claim 11 further comprising enabling an authorized storage medium which has been disabled, including replacing at least an identity and encryption key of said storage medium.

14. The method of claim 11 further comprising interrogating said drives by said host computer regarding identification of said storage media.

15. The method of claim 11 further comprising periodically transmitting a replacement encryption key from said host computer to said drives, and employing said replacement key to restore said encrypted information in said storage media.

16. The method of claim 11 wherein said information is encrypted and decrypted with a public and private key system.

17. The method of claim 11 wherein storing encrypted information in each of said storage media includes employing a different encryption key with each said storage medium.

18. The method of claim 17 wherein said encryption key is recognized by said host computer as said identity of said storage medium.

19. A method of preventing piracy of stored information comprising:

providing a host computer and providing a plurality of information storage media having associated drives, said storage media being both readable and writable, said storage media being optical disks or magnetic disks, said associated drives storing information in each of said storage media in independently encrypted form and decryptable by said associated drives on-the-fly, including storing an identity of each of said storage media, the encryption and decryption performed using a cryptographic key stored within said associated drive transmitting said identities of said storage media from said associated drives to said host computer, comparing by said host computer said identities, and if said host computer detects a duplicate identity, disabling said storage media having said duplicated identity, transmitting from said host computer to said drives replacement keys for encryption and decryption of said information in said associated storage media not having said duplicated identity, and storing said replacement keys in said drives.

20. The method of claim 19 wherein comparing by said host computer said identities includes matching said identities with those from an authorized list, and if said host computer detects an unauthorized identity, disabling said storage medium having said unauthorized identity.

21. The method of claim 19 further comprising issuing a different encryption key to an associated drive of an authorized storage medium having said duplicate identity, including storing a new identity in said authorized storage medium.

\* \* \* \* \*